(No Model.) 3 Sheets—Sheet 2.
V. A. SALLOT.
UNIVERSAL CHUCK.
No. 570,736. Patented Nov. 3, 1896.
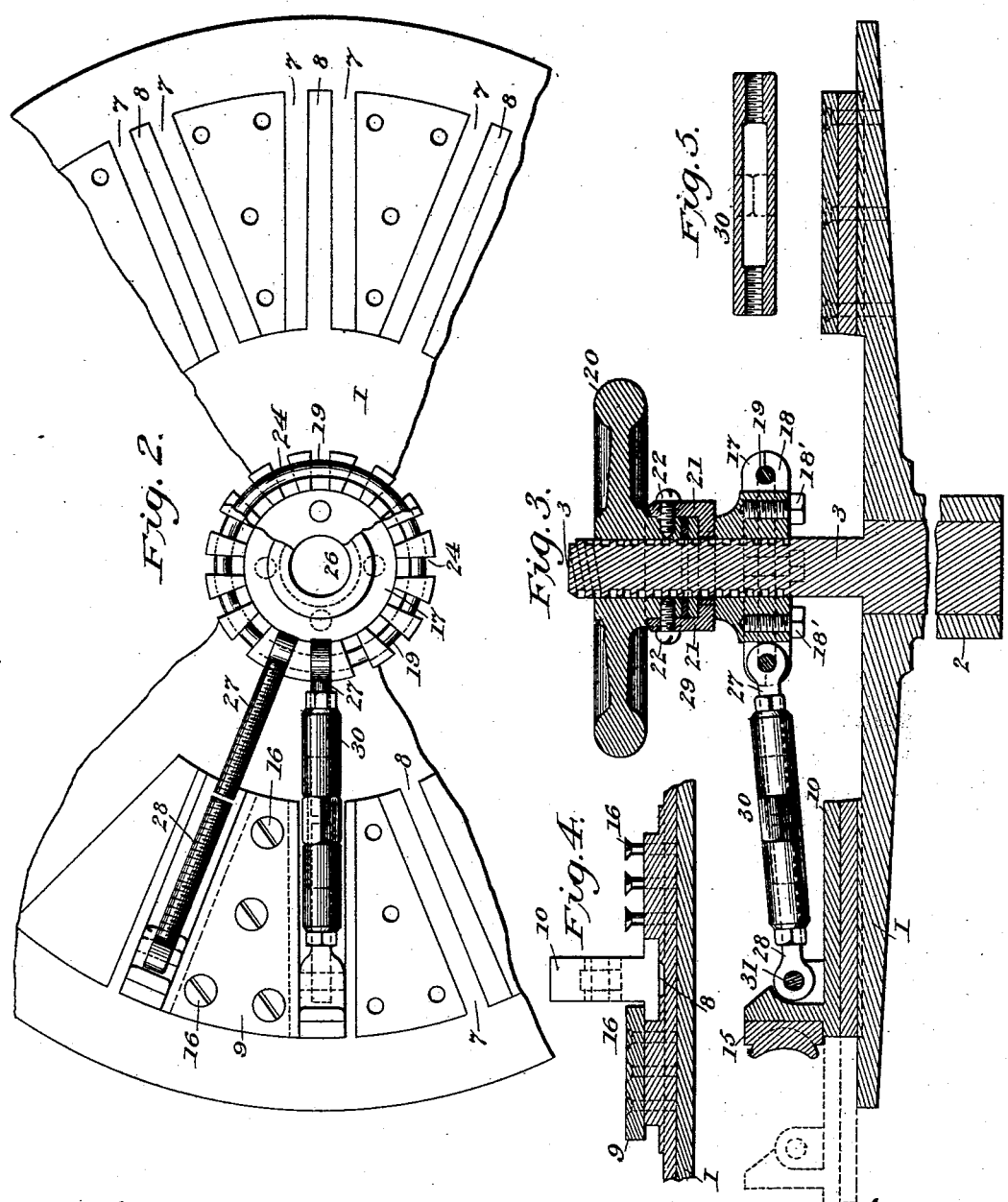

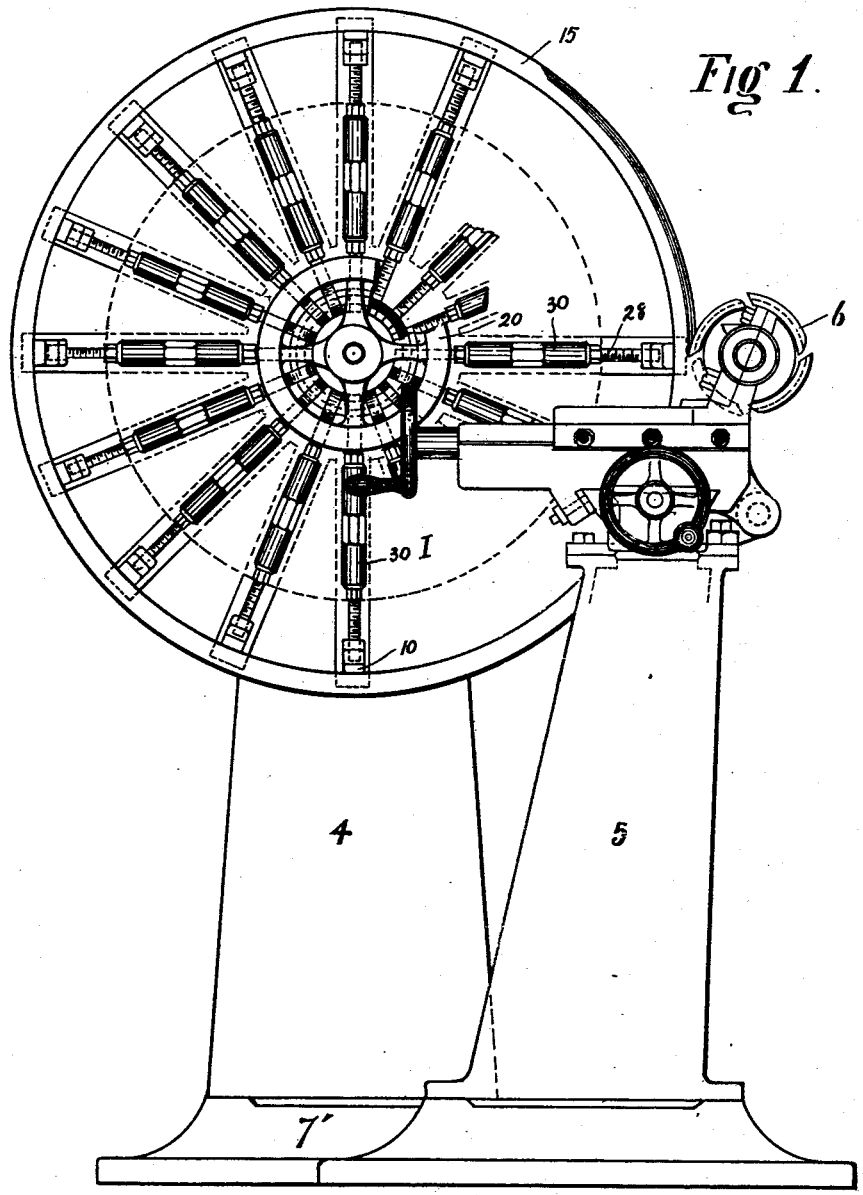

(No Model.) 3 Sheets—Sheet 3.
V. A. SALLOT.
UNIVERSAL CHUCK.
No. 570,736. Patented Nov. 3, 1896.
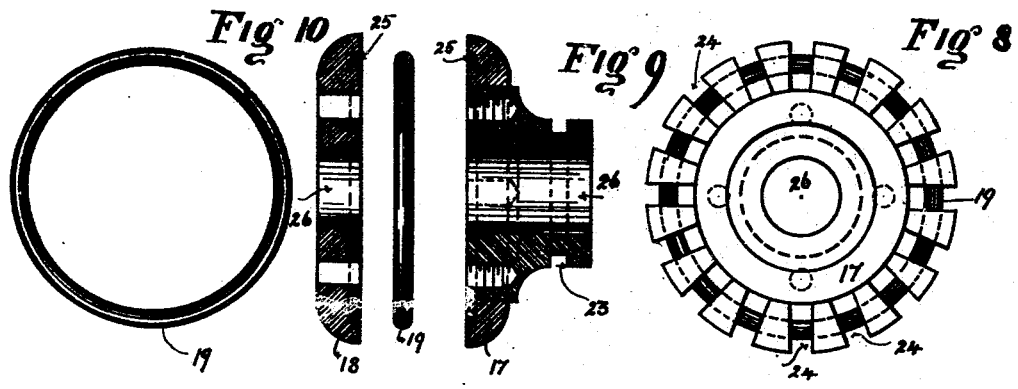
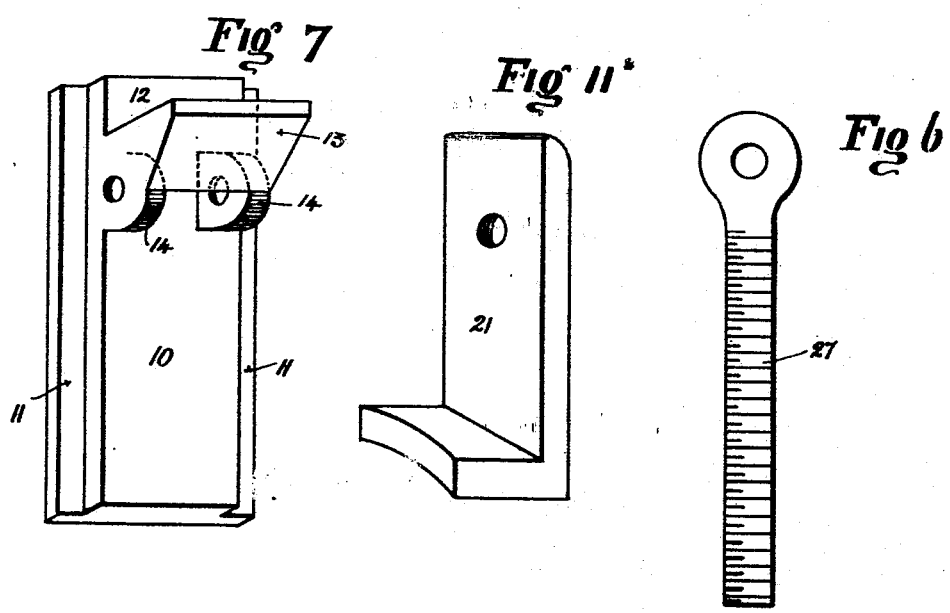
Victor A. Sallot INVENTOR
BY Chapin & Denny
his ATTORNEYS.

UNITED STATES PATENT OFFICE.

VICTOR A. SALLOT, OF FORT WAYNE, INDIANA.

UNIVERSAL CHUCK.

SPECIFICATION forming part of Letters Patent No. 570,736, dated November 3, 1896.

Application filed November 11, 1895. Serial No. 568,578. (No model.)

*To all whom it may concern:*

Be it known that I, VICTOR A. SALLOT, a citizen of the United States, residing at Fort Wayne, in the county of Allen, in the State of Indiana, have invented certain new and useful Improvements in Universal Chucks; and I do hereby declare that the following is a full, clear, and exact description of the invention, which will enable others skilled in the art to which it appertains to make and use the same, reference being had to the accompanying drawings, which form part of this specification.

My invention relates to improvements in universal chucks for bicycle-rim-turning lathes.

My invention comprises a universal chuck having a multiplicity of gripping-jaws, preferably sixteen in number, slidingly mounted upon corresponding slideways in a circular disk or face-plate, the said jaws being arranged radially to the mandrel upon which the said disk is mounted and having a pivotal connection with the common fulcrum-ring arranged in a radially-slotted hub loosely mounted on said mandrel, whereby the said jaws are adapted for both an independent and universal radial adjustment.

The object of my invention is to provide a self-centering universal chuck for bicycle-rim-turning lathes having a series of radial rim-gripping jaws which are adapted for both an independent and a universal adjustment in a convenient and reliable manner.

The novel feature of my invention consists in the improved means for securing a simultaneous and universal adjustment of the said series of gripping-jaws.

In the accompanying drawings similar figures of reference indicate corresponding parts throughout the several views.

Figure 1 is a front elevation of my improved chuck in position upon the supporting mandrel or arbor, showing the relative arrangement of the gripping-jaws in their respective guideways and gripping a vehicle-rim in position for turning its outer concave perimeter and also showing the means for connecting the said jaws to the common fulcrum-ring of the adjusting-hub, a portion of the said jaws being cut away, the cutting-tool for turning the concave perimeter being also shown in its relative position upon its supporting-standard. Fig. 2 is a fragmentary view of the face-plate, showing a plan of the radial guideways and the means for independently adjusting the gripping-jaws. Fig. 3 is a diametric cross-section of the face-plate, adjusting-hub, and operating hand-wheel, showing the manner of connecting the same and also showing a side view of one of the chuck-jaws in position upon its guideways, showing the means for actuating the same and also showing a portion of the vehicle-rim in position in said jaws as it appears after the operation of shaping its outer perimeter. Fig. 4 is a front end view of one of the jaws in position with one of the retaining-plates removed. Fig. 5 is a longitudinal central section of the internally-threaded shell or sleeve adapted to contain the proximate ends of the eyebolts by which the said jaws are connected to the fulcrum-ring. Fig. 6 is a detail of one of the eyebolts. Fig. 7 is a detail perspective of one of the gripping-jaws, showing the lateral retaining-flanges for the guideways, the perforated lugs for the eyebolt, and the retaining-recess for the vehicle-rim. Fig. 8 is a plan of the radially-slotted hub, showing the fulcrum-ring upon which the inner end of the eyebolts are pivoted. Fig. 9 is a vertical central section of the same, showing the annular groove by which the jaw-adjusting hand-wheel is secured to the hub and showing a like section of the fulcrum-ring and the removable bottom plate. Fig. 10 is a detail of the fulcrum-ring severed at one point to admit of the placing of the said eyebolts thereon. Fig. 11 is a detail of one of the connecting-plates for the slotted hub.

All parts of my improvement are preferably of metal.

The circular disk or face-plate 1, on which the gripping-jaws are mounted, of proper strength and dimensions, is centrally apertured for the mandrel 3 and is provided upon its rear face with a cylindrical extension or hub 2, by which the said disk is rigidly secured in any proper manner to the said mandrel. The said mandrel is mounted in the usual or other proper manner upon proper supporting-standards, only one of which is shown, Fig. 1, and is provided with the usual and well-understood actuating mechanism. (Not shown in the drawings.) The supporting-standard 5 is of a less height than the standard 4, and they are both rigidly bolted to the base 7'. Upon the said standard 5 is properly arranged the usual actuating mechanism for both a longitudinal and a cross feed, and also for the cutting-tool 6, none of which mechanism constitutes any part of my invention and needs no further description in this connection. The outer surface of the said face-plate 1 is provided with a series of recessed radial guideways, sixteen in number, in the thickened portion of the said plate, provided with the parallel slideways 7, Fig. 2, separated by a shallow radial groove 8 of substantially equal width. Upon these slideways the gripping-jaws are adapted for radial adjustment. The inner portion of the said disk is slightly below the surface of the said guideways, Fig. 3, which is on the same plane as the said groove 8, Fig. 2.

The gripping-jaws 10, Fig. 7, are provided upon each side throughout their length with the lateral rectangular flanges 11 and with the upright head 13, having upon each side and upon the rear face thereof the perforated ears 14, between which the forward end of the adjacent eyebolt is pivotally secured. The forward end of the said jaw has a recess 12, adapted to receive the unturned inner face of the vehicle-rim 15, as seen in Fig. 3. The jaws thus constructed are slidingly mounted upon the said slideways 7 and are loosely secured therein by means of the retaining-plates 9, whose opposite edges overhang the adjacent lateral flanges 11 of each pair of adjacent jaws and are rigidly secured in such position by suitable holding-screws 16.

That portion of the forward end of the said mandrel 3 which extends beyond the said disk 1 is somewhat reduced in size and has its greater portion screw-threaded, as shown in Fig. 3. Upon this screw-threaded portion the slotted hub and its actuating hand-wheel are mounted.

The annular hub 17 has its circular base provided with a plurality of radial vertical slots 24, corresponding in number and arrangement with the said guideways of the face-plate 1. At or near its contracted top is arranged an annular groove 23, Fig. 9, for the purpose hereinafter described. The said hub 17 is cast in two parts, the base-piece 18 being detachable, but is secured in position by proper holding-screws 18', Fig. 3. The two parts of the said hub have a smooth central bore 26 of sufficient diameter to slide freely upon the said mandrel, and they have their meeting faces provided with coincident annular semicircular grooves adapted to inclose and secure the ring 19, severed at one point of its circumference and serves as common fulcrum or pivot for the inner ends of the eyebolts 27, presently to be described, Fig. 8.

The hand-wheel 20 has a cylindrical extension upon its inner face, which is separated from the top of the hub 17 by an annular brass friction-plate or washer 29, Fig. 3, and has its perimeter flattened at diametrically opposite points thereon for the securing of the upper end of the respective connecting-plates 21. The said hand-wheel 20 has a central threaded bore adapted for a screw-threaded engagement with the said mandrel, as shown, and is securely but loosely connected with the hub 17 by the two diametrically opposite connecting-plates 21, their lower end being provided with a right-angular flange adapted for a loose engagement with the said hub 17 in the annular recess 23, the upper end thereof being rigidly fixed to the said hand-wheel by proper holding-screws 22, Fig. 3. It is obvious that by such connection the said hand-wheel can be freely rotated in either direction and carry the hub 17 with it in its longitudinal adjustment upon the said mandrel without any interference with the relative arrangement of said hub with the said face-plate, for the said hub has a rotative engagement with the said plates 21 and is loosely mounted upon the said mandrel. The means for connecting each of the said gripping-jaws with the hub 17 consists of a pair of screw-threaded eyebolts 27 and 28, identical in form and dimensions, and a cylindrical internally-threaded shell or sleeve 30, adapted to longitudinally adjust the said bolts by a screw-threaded connection, Figs. 2, 3, and 5.

The bolts 27 and 28 each have upon their outer end an enlarged circular head centrally apertured, forming an eye by which they are pivotally secured, the former upon the ring 19 in the slots 24 of the hub 17 and the latter upon the pin 31 in the perforated lugs 14 of the jaw 10. The bodies of the said bolts are provided, respectively, with left-handed and right-handed screw-threads, and the said shell or sleeve 30 is correspondingly internally screw-threaded at its extremities, the central portion being cored out, as screw-threads at that portion are unnecessary. The external surface of the said sleeve, at a point intermediate its ends, is provided with plane faces for a turning-wrench. The common fulcrum-ring 19, severed at one point to permit of the removal or replacing of the said eyebolts thereon, is loosely mounted in the slotted base of said hub 17 and is conveniently removable by detaching the base-plate 18, after which the inner end of the eyebolts 27 can be removed from the said ring at its severed point at pleasure. The inner flange upon the lower end of the said plates 21 is sufficiently concave to coincide with the recess 23 of the said hub, as seen in Fig. 11, and the inner hub or flange of the hand-wheel 20 is slightly flattened at diametrically opposite points for the upper ends of the said plates 21.

The operation of my invention thus described is obvious, and briefly stated is substantially as follows: The gripping-jaws 10, being slidably mounted upon the slideways 7 of the radial guideways of the face-plate 1 and secured therein by the retaining-plates 9, are adapted for a simultaneous and universal radial adjustment by a single movement of the operating hand-wheel 20, for as the slotted hub, through its connection with the hand-wheel, is made to approach the face-plate the said jaws will be simultaneously and uniformly forced outwardly, as seen in dotted outline in Fig. 3, to engage and secure a vehicle-rim of the largest required diameter, and a reverse adjustment of said hub upon its supporting-mandrel by the same means will likewise simultaneously withdraw the said jaws from their advanced position to grip and secure a vehicle-rim of a less diameter, thus being adapted for convenient and ready adjustment to any ordinary-sized rim, which in practice is from twenty-four to thirty inches for bicycle-wheels, though my improved chuck can be constructed and operated with equal facility for any desired diameter of rim. It is apparent that each of the said jaws is adapted for a convenient adjustment by the use of a wrench upon the threaded sleeve 30, as rotating the said sleeve in one direction will simultaneously spread the said eyebolts, and rotating the said sleeve in the other or reverse direction will contract their extension. The vehicle-rim 15 will be firmly secured in position for successive presentation of its outer perimeter to the rim-cutting tool 6 by being mounted in the recesses 12 of the said jaws, as seen in Fig. 3, and as the said rim during the operation of cutting is thus braced and supported at sixteen different points a perfectly true rim is invariably secured.

It is obvious that the particular number of jaws employed is immaterial, as any plurality of said jaws simultaneously actuated and arranged as described comes within the scope of my invention.

My improved universal chuck is thus simple and economical in construction, convenient in use, and positive, efficient, and reliable in operation.

Having thus described my invention and the manner of operating the same, what I claim as my invention, and desire to secure by Letters Patent, is—

1. In a universal chuck, the combination of a centrally-apertured disk 1, having upon one face thereof a plurality of radial guideways 7, a plurality of radial jaws 10 slidingly mounted in said guideways and adapted to grip the perimeter of a vehicle-rim for the purpose specified, a radially-slotted hub 17 loosely mounted upon the supporting-mandrel adjacent to the means for adjusting said jaws and in concentric relation to the said disk, provided with a detachable base-plate 18 and a common fulcrum-ring 19 loosely mounted therein as shown, for the purpose specified, a pivotal connection with the said hub comprising a pair of screw-threaded eyebolts arranged as shown in an internally-screw-threaded sleeve 30 for the purpose specified, and having the outer ends pivotally connected with the said hub and the said jaws respectively, and the operating hand-wheel 20 having a screw-threaded connection with the supporting-mandrel 3, and a rotatable connection with the said hub, and adapted to radially adjust the said jaws, whereby all adjustments of said jaws can be made upon the same side of the said disk, substantially as described.

2. In a universal chuck, the slotted hub 17 having a radially-slotted base provided with a detachable portion 18, and having a common fulcrum-ring 19 loosely mounted therein, as described, and having an annular recess 23 for the connecting-plates 21, the said hub being rotatably connected with means for adjusting the same, and being loosely mounted upon the supporting-mandrel, substantially as described.

Signed by me, at Fort Wayne, Allen county, State of Indiana, this 6th day of November, A. D. 1895.

VICTOR A. SALLOT.

Witnesses:
NEWTON DOUGHMAN,
MARK E. D. KEPLING.